Patented Aug. 15, 1933

1,922,154

UNITED STATES PATENT OFFICE 1,922,154

PROCESS FOR INCREASING THE OUTPUT OF OIL WELLS

Melvin de Groote, St. Louis, Mo., assignor to Tretolite Company, Webster Groves, Mo., a Corporation of Missouri No Drawing. Application January 9, 1933
Serial No. 650,860

10 Claims. (Cl. 166—21)

This invention relates to the treatment of oil wells, particularly deep wells, for the purpose of increasing the output or quantity of oil produced by a well. Specifically, the invention is concerned with the treatment of oil wells in which the oil-bearing stratum consists of a lime sand, a limestone, or a formation that is related to a calcareous or magnesian formation. In such siliceous or similar strata from which petroleum oil is derived, there is a clogging of the oil sands, due to the presence of alkaline earth carbonates primarily calcium carbonate. It is believed that the subterranean water becomes saturated with calcium bicarbonate under pressure, and that when the well is drilled in, and pressure released, some of the subterranean water escapes with the oil, with the result that the solubility of the calcium carbonate or bicarbonate in the remaining subterranean water becomes reduced to such an extent or degree that precipitation takes place in the pores of the siliceous sand of the oil-bearing stratum. So far as my invention is concerned, it is immaterial whether the formation itself is truly calcareous or is a siliceous formation clogged with a calcareous deposit. Moreover, I wish it to be understood that magnesium carbonate deposits are as readily susceptible to treatment by my process as are calcium carbonate deposits.

The object of my invention is to make it possible to remove deposits of the kind above referred to from the oil bearing stratum of a well, without the necessity of removing the working parts of the well and without the necessity of resorting to procedure which might damage the well structure, such as the use of dynamite. To this end I have devised a novel process for increasing the output of oil wells, which contemplates introducing into the well a treating solution that has certain characteristics or properties which make it superior to and an improvement upon the treating solutions heretofore used to increase the output or quantity of oil produced by a well. Broadly stated, the treating solution contemplated by my process consists of an aqueous acid solution emulsified in a suitable vehicle that effectively protects the metallic parts of the well from injury by the acid in the solution while the solution is being introduced into the well. The acid used to produce or constitute the treating solution may consist of hydrochloric acid, nitric acid, or a mixture of the two, in a suitable strength that will permit reaction to take place between the acid of the solution and the calcareous material in the oil-bearing stratum, thereby resulting in the formation of water-soluble calcium and magnesium salts, such as calcium chloride, calcium nitrate, etc. The vehicle in which the acid of the treating solution is emulsified, may consist of a non-aqueous substance or material, such as crude oil, or a coal tar distillate, such as solvent naphtha, or carbon tetrachloride. In practising my process I prefer to use a treating solution consisting of hydrochloric acid emulsified in crude oil, due to the fact that such an emulsion is of the water-in-oil type in which the aqueous phase, i. e., the solution of acid in water, is surrounded by oil as the continuous phase. Furthermore, each droplet of acid solution is enclosed by an encasement of matter which is the emulsifying agent. The emulsifying agent employed is one which is colloidally soluble in the oily vehicle, and is not chemically reactive with hydrochloric acid or similar acid. Oil-soluble petroleum sulfonic acid is particularly adapted for use as the emulsifying agent of the treating solution contemplated by my process. Another suitable emulsifying agent is oil-soluble petroleum asphalt. Certain oil-soluble stearine pitches, derived from distillation of certain fatty acids, are also suitable. Sufficient emulsifying agent is used to produce a reasonably stable emulsion. Generally speaking, from two to five percent of the selected emulsifier is added to the selected vehicle and the said mixture is then added to or combined with approximately one-half its volume of the selected acid, which may be ordinary hydrochloric acid of commerce with or without dilution.

The procedure of increasing the output of a well or increasing the flow of oil from a limestone formation of oil-bearing stratum by treating the same with hydrochloric acid is old and well known. The acid has the effect of attacking and dissolving the rock or deposit, thus enlarging the cavity or opening at the bottom of the well and increasing the porosity of the oil-bearing formation. The objection to the old and previously known chemical treatment is that the acid used as the treating agent attacks the metal parts of the well structure, with the result that the damage to the well and its working parts may be far greater than the advantage derived or obtained from the treatment of the calcareous deposits. In order to eliminate or reduce the corrosive action of the hydrochloric acid solution on the metallic parts of the well, it has been proposed to add a commercial inhibitor to the hydrochloric acid, such as the inhibitors employed in the pickling of steel sheets, but such procedure has the inherent objection of effecting the removal of the protective coating of iron oxide which collects on the tubing, strainer and other metallic parts of the well. In other words, when hydrochloric acid plus an inhibitor of the ordinary type, is introduced into a well for the purpose of reacting with the calcareous stratum at the bottom of the well, the inhibitor will protect the metallic parts of the well from injury, but the inhibitor will not prevent the acid solution from removing the oxide layer that coats the metallic parts in the well and which serves as a protective coating for said metallic parts. This is objectionable, because each time a protective coating of iron oxide is removed, a new coating will thereafter form, and if the well is treated repeatedly, the metal parts will be seriously affected by the oxidation that takes place after each hydrochloric acid treatment.

My improved process has the desirable feature or characteristic that the hydrochloric acid or similar acidic material used in the treating solution will react with the calcareous strata and yet will have no deleterious effect on the protective iron oxide coating on the metallic parts of the well. This, of course, is because the hydrochloric acid is used in the form of an emulsion of an aqueous acid solution in which each droplet of acid is surrounded by an encasement of matter, namely, the emulsifier, and said droplets are dispersed in a continuous non-aqueous phase. Obviously, such an emulsion can be introduced into the well and injected or forced back into the calcareous strata by means of suitable external pressure, without contact between the metallic parts of the well and the enclosed droplets of hydrochloric acid. It is well known that materials of a capillary structure break down emulsions, and that many emulsions may be broken by passage through a filter or through a bed of sand. Hence, in practising my process, when the emulsion of hydrochloric acid in oil contacts with the capillary or porous oil-bearing strata, the emulsion is immediately broken down, and the hydrochloric acid is permitted to react with the calcareous carbonates. It is believed that the foregoing clearly shows the advantages or desirable characteristics of my process over the prior hydrochloric acid, plus an ordinary inhibitor process, and makes it clear that a well may be treated repeatedly by my process without danger of removing the protective coating of iron oxide on the metallic parts in the well.

In practising my process the treating solution is introduced into the well in the same manner as heretofore employed or suggested in treating an oil well with hydrochloric acid alone, or hydrochloric acid, plus an inhibitor. Generally speaking, it is desirable that the gas generated by the chemical reaction be employed to drive the treating solution into the calcareous strata at the bottom of the well. It is also desirable to pump or bail out the water from the bottom of the well, so that the emulsion will have immediate access to the calcareous space surrounding the well inlet. The emulsion is heavier than oil and tends to pass through the oil layer without marked commingling with the oil. For this reason, it is not usually necessary to remove the oil which is standing in the well. After reaction is completed the spent acid liquor may be removed from the bottom of the well, and if desirable, or necessary, a second acid charge be allowed to react with the calcareous formation. In some cases, it is more suitable simply to pour the treating solution into the top of the well, and in other cases it is more desirable to lower the treating solution into the bottom of the well with a bailer.

Peculiarly enough, commercial inhibitors are effective in inhibiting the reaction of hydrochloric acid alone or sulfuric acid alone, but are not effective when small amounts of nitric acid are present. In many cases calcareous oil-bearing structures appear to be coated with a trace of wax-like material which prevents the hydrochloric acid from acting rapidly with same. The initial reaction is very slow. The addition of a small amount of nitric acid, for instance, the ratio of 2% of nitric acid to 98% of hydrochloric acid, is sufficient to make the hydrochloric acid very reactive, even at the outset of the contact stage. Nitric acid is not desirable as an addition agent to hydrochloric acid if one is dependent on the addition of inhibitors to prevent metallic corrosion, because the inhibitor does not markedly decrease the corrosiveness of nitric acid on iron. In my present process, however, in which the acid is enclosed in droplets so that there can be no contact with the metallic parts of the well, there is no objection to the addition of nitric acid or small amounts of some other acid, such as acetic acid or sulfuric acid, if desired.

I wish it to be understood that acid of any suitable strength may be employed, and that any suitable emulsifier may be employed. Also that one or more acids or mixtures thereof may be employed. Obviously, any suitable or preferred procedure may be employed to get the treating solution to the point or place where it is used. The novelty of my invention, as I interpret it, resides essentially in the use of an aqueous acid solution emulsified in such a way as to prevent contact between the acid droplets and the metallic parts of the well, or with the protective oxide coating of the metallic parts of the well, the emulsion being broken down or resolved when it contacts with the porous or capillary calcareous structure surrounding the well inlet, with the result that reaction of the acid then takes place so as to obtain the beneficial results previously referred to. Presumably, an inhibitor could be added to the hydrochloric acid before it is emulsified, but such an addition would only be an added expense, and an added manipulative operation, and would not add to the intrinsic value of the process as a whole.

While my broad idea contemplates the use of one or the other of the acids mentioned, of a strength suitable for the purpose required, I prefer to use a treating solution comprising 15% hydrochloric acid and 1% nitric acid. Certain formations appear to be largely susceptible to strong acid, although there may be a residue that is more susceptible to weak acid. Therefore, in cases where a secondary treatment is applied after removal of the spent acid liquor employed in the first treatment, it is frequently desirable that the second treatment consist of a weak acid, for instance 5% acid, as compared with 15% acid in the original emulsion. In each case the acid is emulsified, preferably with twice its volume of crude oil, containing approximately 5% of petroleum asphalt dissolved therein.

Having thus described my invention, what I claim as new and desire to secure by Letters Patent is:

1. A process for increasing the output of oil wells, characterized by introducing into a well, a treating medium consisting of an emulsified acid that will pass the metallic parts of the well without having any deleterious effect on same, and upon reaching the calcareous strata at the bottom of the well will break, whereby the acid of the emulsion is permitted to react with said strata.

2. A process for increasing the output of oil wells, characterized by subjecting the oil-bearing strata at the bottom of a well to the action of an acid which is of such a character that it will react with said strata to enlarge the cavity at the bottom of the well or increase the porosity of said strata, and protecting the metallic parts of the well from deleterious action by said acid while it is being conducted to the oil-bearing strata, by introducing the acid into the well in the form of globules of acid encased in a non-aqueous medium.

3. A process for increasing the output of oil wells, characterized by introducing into a well a relatively stable emulsion of an aqueous acid solution emulsified in a non-aqueous vehicle, so as to contact with the capillary oil-producing calcareous strata, said emulsion being so formed that it will not have any deleterious effect on the metallic parts of the well.

4. A process for increasing the output of oil wells, characterized by introducing into a well a relatively stable emulsion of an aqueous hydrochloric acid solution emulsified in a non-aqueous vehicle in such a manner that the emulsion will pass the metallic parts of the well without having any deleterious effect on same and will act upon the capillary oil-producing calcareous strata.

5. A process for increasing the output of oil wells, characterized by introducing into a well a relatively stable emulsion of an aqueous hydrochloric acid solution of approximately 15% strength, emulsified in an oil vehicle in such a manner that the emulsion of acid-in-oil will pass the metallic parts of the well without having any deleterious effect thereon, and thereafter will contact with the capillary oil-producing calcareous strata.

6. A process for increasing the output of oil wells, characterized by introducing into a well, a treating medium comprising hydrochloric acid and nitric acid, emulsified in a non-aqueous vehicle.

7. A process for increasing the output of oil wells, characterized by introducing into a well a relatively stable emulsion of an aqueous hydrochloric acid solution of approximately 15% strength with the addition of 1% of nitric acid, emulsified in an oil vehicle in such a manner that the emulsion of acid-in-oil will pass the metallic parts of the well without having any deleterious effect on same, and thereafter will react with the capillary oil-producing calcareous strata.

8. A process for increasing the output of oil wells, characterized by introducing into a well a relatively stable emulsion of an aqueous acid solution emulsified in a non-aqueous vehicle so as to contact with the capillary oil-producing calcareous strata, and using the pressure caused by the evolution of carbon dioxide of the reaction to force the acid solution through or into said strata.

9. A process of the kind described in claim 1, which includes the steps of withdrawing the spent acid liquor from the bottom of the well.

10. A process of the kind described in claim 1, which includes the steps of withdrawing the spent acid liquor from the bottom of the well, and thereafter subjecting the calcareous strata to a second acid treatment in which the acid strength is markedly reduced.

MELVIN DE GROOTE.